US 8,176,024 B2

(12) United States Patent
Nakamura (10) Patent No.: US 8,176,024 B2
(45) Date of Patent: May 8, 2012

(54) INFORMATION APPARATUS CONNECTED TO INFORMATION TERMINAL HAVING A PLURALITY OF APPLICATIONS INSTALLED THEREINTO, CONTROL METHOD OF THE SAME, AND PROGRAM PRODUCT

(75) Inventor: Mitsuhiro Nakamura, Mino (JP)

(73) Assignee: Konica Minolta Business Technologies, Inc., Chiyoda-Ku, Toyko (JP)

( * ) Notice: Subject to any disclaimer, the term of this patent is extended or adjusted under 35 U.S.C. 154(b) by 0 days.

(21) Appl. No.: 11/325,329

(22) Filed: Jan. 5, 2006

(65) Prior Publication Data

US 2007/0050350 A1    Mar. 1, 2007

(30) Foreign Application Priority Data

Aug. 30, 2005   (JP) .................................. 2005-249492

(51) Int. Cl.
  *G06F 7/00*   (2006.01)
(52) U.S. Cl. .......................... 707/705; 707/602; 707/781
(58) Field of Classification Search .................. 707/1, 2, 707/3, 705
  See application file for complete search history.

(56) References Cited

U.S. PATENT DOCUMENTS

| 6,116,870 A | 9/2000 | Kraemer | |
| 2002/0095381 A1* | 7/2002 | Takahashi et al. | 705/44 |
| 2002/0107853 A1* | 8/2002 | Hofmann et al. | 707/7 |
| 2004/0117436 A1* | 6/2004 | Newman et al. | 709/203 |
| 2004/0139231 A1* | 7/2004 | Newman et al. | 709/246 |
| 2004/0213283 A1* | 10/2004 | Ohkubo et al. | 370/462 |

FOREIGN PATENT DOCUMENTS

| JP | 54-122214 | | 8/1979 |
| JP | 09-325906 | A | 12/1997 |
| JP | 11-343945 | | 12/1999 |
| JP | 2002-333996 | A | 11/2002 |
| JP | 2003-228498 | A | 8/2003 |
| JP | 2004-259042 | A | 9/2004 |
| JP | 2005-115494 | A | 4/2005 |
| JP | 2005-198345 | A | 7/2005 |

OTHER PUBLICATIONS

Decision to Grant Patent from Japanese counterpart Application No. 2005/249492, mailed Mar. 11, 2008, with certified English language translation.
Japanese Office Action mailed Jun. 11, 2008 issued in corresponding Japanese Appln. No. 2005-011503 with English translation.

* cited by examiner

*Primary Examiner* — Fazlul Quader
(74) *Attorney, Agent, or Firm* — Buchanan, Ingersoll & Rooney PC (57) ABSTRACT

An information apparatus is connected to an information terminal having an application for accessing information installed thereinto. The information apparatus accesses stored information based on an access request from the information terminal using the application, and stores at least one of the application and a function of the application used for the access as a history.

14 Claims, 5 Drawing Sheets

INFORMATION APPARATUS CONNECTED TO INFORMATION TERMINAL HAVING A PLURALITY OF APPLICATIONS INSTALLED THEREINTO, CONTROL METHOD OF THE SAME, AND PROGRAM PRODUCT

This application is based on Japanese Patent Application No. 2005-249492 filed with the Japan Patent Office on Aug. 30, 2005, the entire content of which is hereby incorporated by reference.

BACKGROUND OF THE INVENTION

1. Field of the Invention

The present invention relates to an information apparatus. More particularly, the present invention relates to an information apparatus connected to an information terminal having a plurality of applications installed thereinto, a control method of the same, and a program product.

2. Description of the Related Art

A technique related to a remote control system that remotely exercises a centralized control over many information apparatuses is conventionally well known.

For instance, Japanese Laid-Open Patent Publication No. 2002-333996 discloses a system, i.e., a technique for allowing a monitoring device to monitor whether a target application is executed or whether a user's application is used through an interface using common resources, and for notifying the other system of information.

However, the conventional technique has the following disadvantage. If a plurality of users utilize an information apparatus using a plurality of applications in different environments, the information apparatus is incapable of grasping a utilization status of each application.

SUMMARY OF THE INVENTION

The present invention has been achieved in view of the situations. It is an object of the present invention to provide an information apparatus that can grasp a utilization status of each of a plurality of applications used.

According to one aspect of the present invention, there is provided an information apparatus connected to an information terminal having an application for accessing information installed thereinto. The information apparatus includes: a reception unit to receive an access request from the information terminal using the application; an access unit to access stored information based on the access request received by the reception unit; a specification unit to specify the application used by the access unit for accessing the information and/or a function of the application; and a history storage unit to store at least one of the application and the function of the application specified by the specification unit as a history.

According to another aspect of the present invention, there is provided a method for controlling an information apparatus connected to an information terminal having an application for accessing information installed thereinto. The method includes the steps of: receiving an access request from the information terminal using the application; accessing stored information based on the received access request; specifying the application used for accessing the information and/or a function of the application; and storing at least one of the specified application and the specified function of the application as a history.

According to still another aspect of the present invention, there is provided a program product for controlling an information apparatus connected to an information terminal having an application for accessing information installed thereinto. The program product allows the information apparatus to execute the steps of: receiving an access request from the information terminal using the application; accessing stored information based on the received access request; specifying the application used for accessing the information and/or a function of the application; and storing at least one of the specified application and the specified function of the application as a history.

According to the present invention, the information apparatus determines the type of the application accessed from the information terminal based on a content received from the information terminal.

The information apparatus can thereby grasp the utilization status of each of the applications used.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Referring to the drawings, an information apparatus according to an embodiment of the present invention will be described hereinafter.

Figure 1:
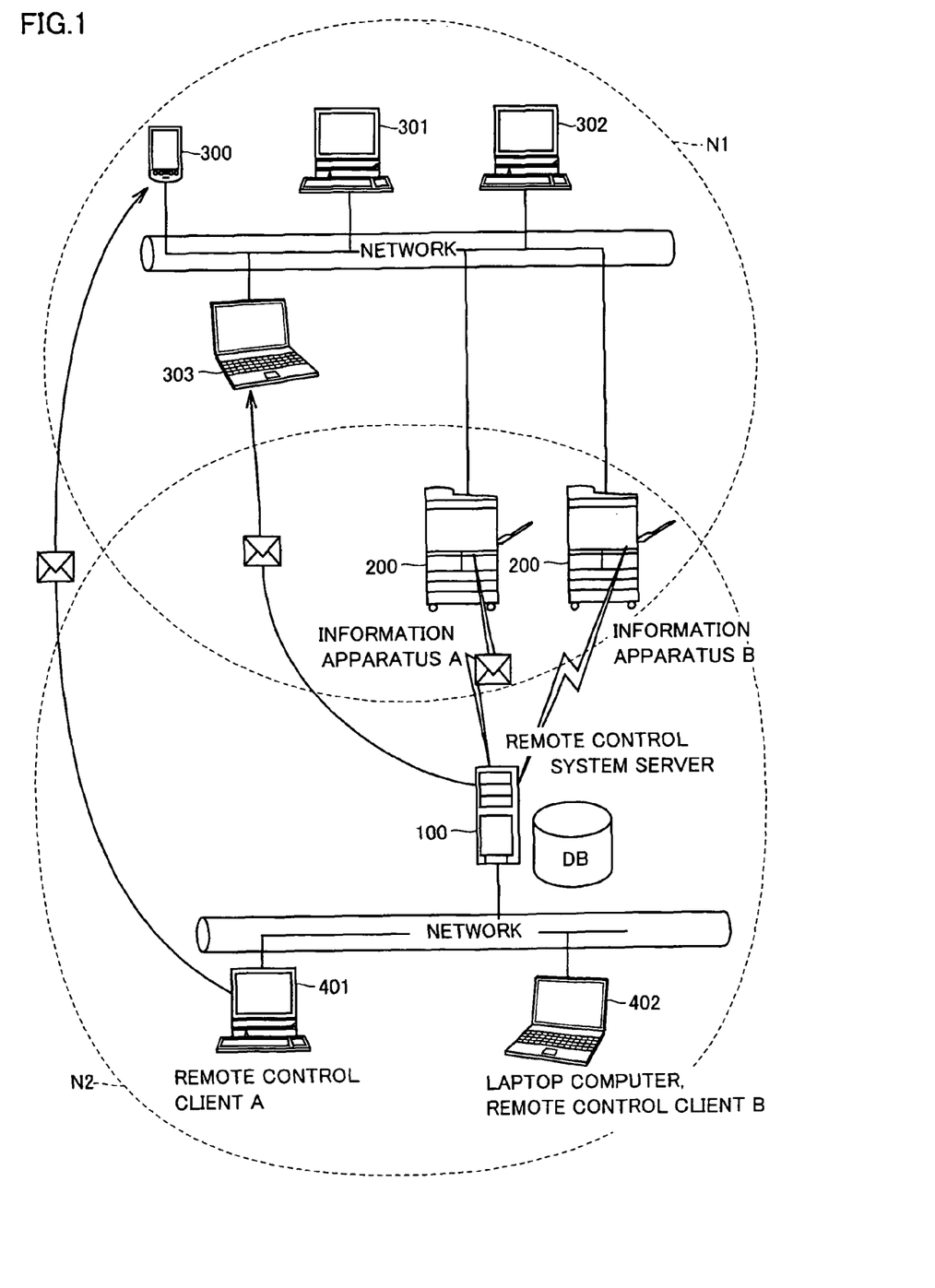
FIG. 1 schematically illustrates an information processing system that includes an information apparatus according to one embodiment of the present invention.

Referring to FIG. 1, an information processing system includes two networks: a network N1 and a network N2.

In network N1, a plurality of information terminals 300 to 303 are connected to a plurality of information apparatuses 200 (information apparatuses A and B). In network N1, information apparatus 200 is accessible from information terminals 300 to 303 for a plurality of types of applications.

Information terminal 300 is, for example, a personal digital assistance (PDA). Information terminals 301 and 302 are, for example, desktop personal computers, respectively, and information terminal 303 is, for example, a notebook personal computer. Namely, in network N1, a type of each of information terminals 300 to 303 is not limited to a specific one as long as it has a communication function.

Information apparatus 200 is a multifunctional machine that has printer and scanner functions. In network N1, information apparatus 200 is not limited to the multifunctional machine as long as information apparatus 200 has a communication function, and may be a single printer or a single scanner.

Information apparatus 200 is connected to network N2. In network N2, a remote control system server 100 is connected to remote control client terminals 401 and 402.

Remote control system server 100 requests information apparatus 200 to transmit access information to be described later. Remote control system server 100 provides remote control client terminals 401 and 402 with the access information and sends advertisement mail to information terminals 300 to 303 based on the access information. In addition, remote control client terminals 401 and 402 send advertisement mail to information terminals 300 to 303 based on the access information.

Figure 2:
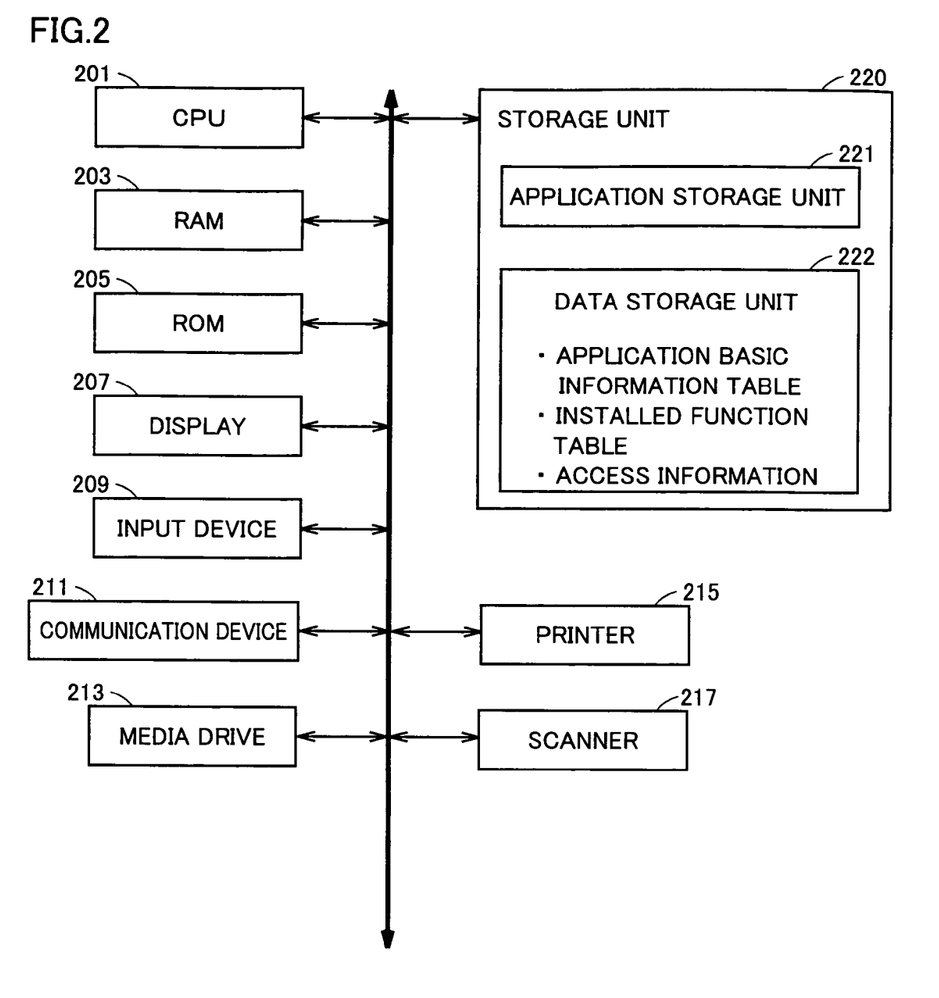
FIG. 2 is a control block diagram of the information apparatus illustrated in FIG. 1.

Referring to FIG. 2, information apparatus 200 includes a central processing unit (CPU) 201 that controls entirety of apparatus 200, a random access memory (RAM) 203 that temporarily stores data, a read only memory (ROM) 205 that In the application basic information table, a name ("application"), identification information ("application ID"), a communication protocol to be used, a type of a possible access, and a type of data to be communicated are stored for every application while being associated with one another.

The installed function table includes information for specifying functions included in each application. Table 2 shows one example of the installed function table.

TABLE 2

| Application | Function type | Function ID | Communication protocol | Access type | Data type | Utilized function |
|---|---|---|---|---|---|---|
| Application A | A | a | SNMP | R/O | Status | Status management |
|  | B | b | FTP | R/W | Counter | Counter management |
|  | C | c | SNMP | R/W | Address information | Address information management |
|  | D | d | SMTP | R/O | Management information | Mail contact |
|  | E | e | SNMP | R/W | User information | User registration |
| Application B | A | — | HTTP | R/W | User information | User registration |
|  | B | c | HTTP | R/W | Address information | Address information management |
| . | . | . | . | . | . | . |
| . | . | . | . | . | . | . |
| . | . | . | . | . | . | . | stores programs, constants, and the like, a display 207 that displays information, an input device 209 that inputs information from an outside of apparatus 200, a communication device 211 that holds information communication with the other apparatus, a media drive 213 that writes and reads information to and from a recording medium such as a compact disc read only memory (CD-ROM), a printer 215 that outputs an image, a scanner 217 that generates image information on an original, and a storage unit 220 that stores various pieces of information. Display 207 and input device 209 can be constituted by a liquid crystal display and a touch panel mounted on the liquid crystal display, respectively.

Storage unit 220 includes an application storage unit 221 that stores an application program executed by CPU 201, and a data storage unit 222 that stores various pieces of data such as data used for applications.

The information stored in data storage unit 222 includes an application basic information table, an installed function table, and access information.

The application basic information table includes basic information for specifying each of a plurality of applications executed by information apparatus 200. Table 1 shows one example of the application basic information.

TABLE 1

| Application | Application ID | Communication protocol | Access type | Data type |
|---|---|---|---|---|
| Application A | appA | SNMP, FTP, SMTP | R/W | Apparatus information |
| Application B | appB | HTTP | R/W | User registration information, Address data |
| . | . | . | . | . |
| . | . | . | . | . |
| . | . | . | . | . |

In the installed function table, an application name ("application") and information on the respective functions included in each application are stored for every application while being associated with one another. The information on each function includes a function name ("function type"), an ID allocated to the function ("function ID"), a communication protocol used by the function, a type of a possible access for the function, a type of data to be communicated, and a content of the function utilized ("utilized function").

The access information is information that indicates a history as to which user accessed which function of information apparatus 200 on network N1. According to this embodiment, the access information includes information as to when and which user or which terminal used which function of which application. In addition, the access information is stored in every information apparatus. Namely, the information apparatus stores the access information on itself.

Figure 3:
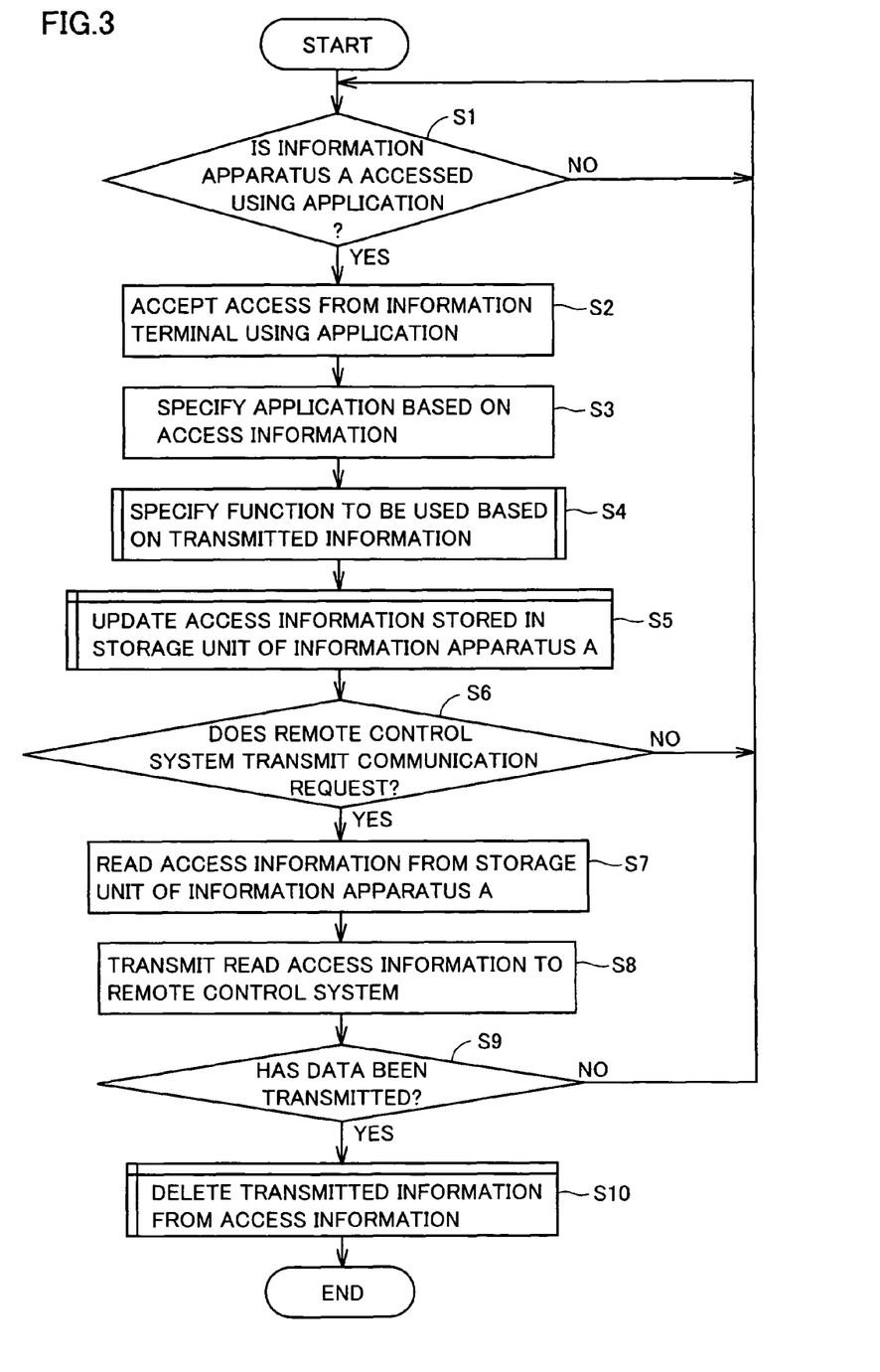
FIG. 3 is a flow chart of a process executed in the information processing system illustrated in FIG. 1 when access information is generated in the information apparatus.

FIG. 3 is a flow chart of a process executed in the information processing system according to this embodiment when the access information is generated (or updated) in information apparatus 200. A process executed when access information on information apparatus A, which is one of information apparatuses 200 illustrated in FIG. 1, is generated will be now described.

Referring to FIG. 3, in step SI, CPU 201 determines whether any one of information terminals 300 to 303 accesses information apparatus A using an application. If CPU 201 determines that information apparatus A is accessed, the process proceeds to step S2.

In step S2, CPU 201 accepts an access from any one of information terminals 300 to 303 using the application.

In step S3, CPU 201 specifies the application used for the access based on information transmitted from the information terminal during the access. Specifically, in this embodiment, CPU 201 refers to the application basic information table (see Table 1), and searches for an application associated with a type of a communication protocol used for the access, thereby specifying the application. For instance, if the communication protocol is a HyperText Transfer Protocol (HTTP), CPU 201 specifies the application used for the access as "application B". If the communication protocol is a Simple Network Management Protocol (SNMP), a Simple Mail Transfer Protocol (SMTP), or a File Transfer Protocol (FTP), CPU 201 specifies the application used for the access as "application A". The protocol used in a communication is specified by specifying through which interface among interfaces corresponding to respective protocols communication device 211 holds the communication. If finishing specifying the application, CPU 201 stores an application ID of the specified application in RAM 203.

Figure 4:
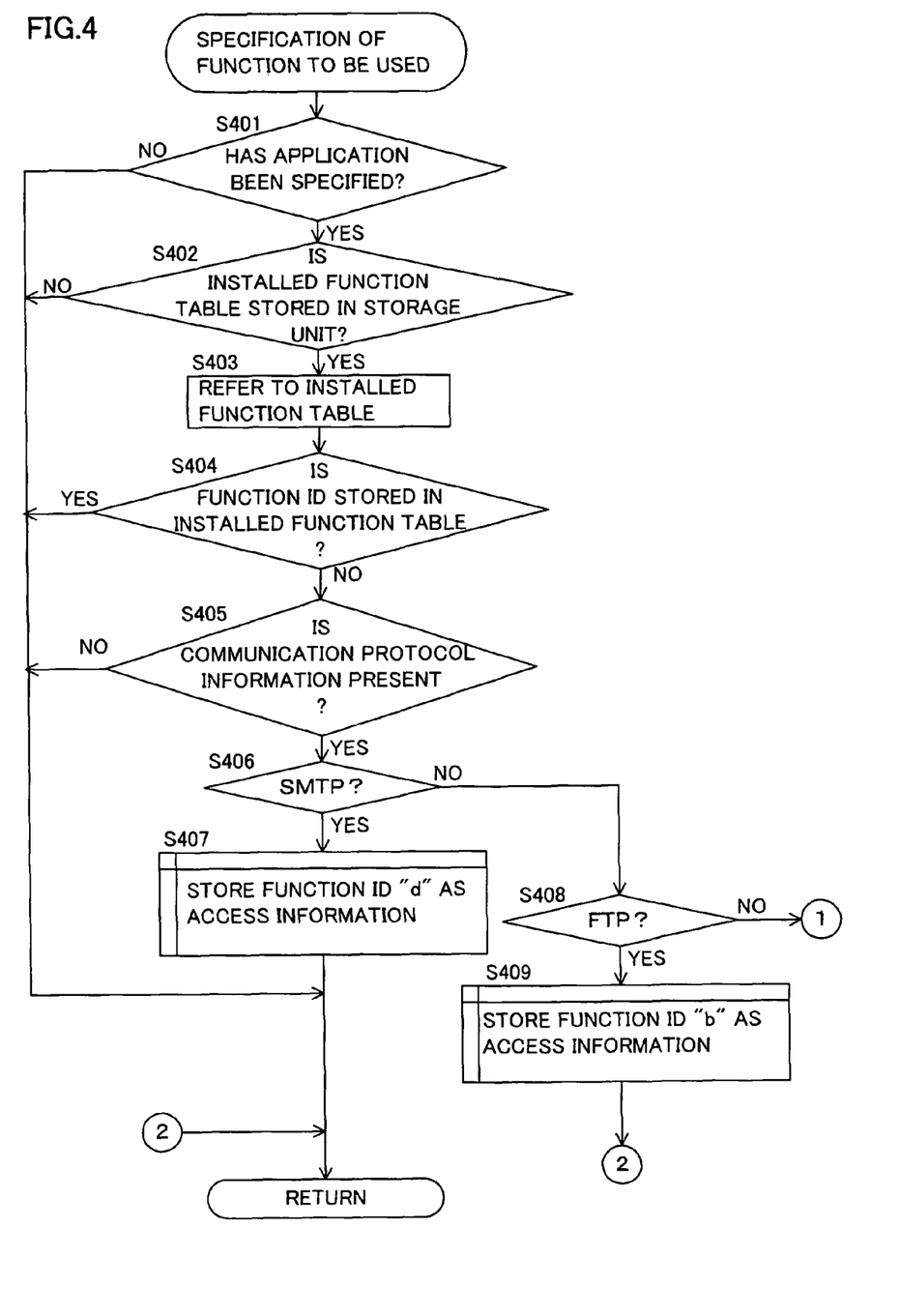
FIGS. 4 and 5 are flow charts of subroutines of the process illustrated in FIG. 3 executed when a used function is specified, respectively.
Figure 5:
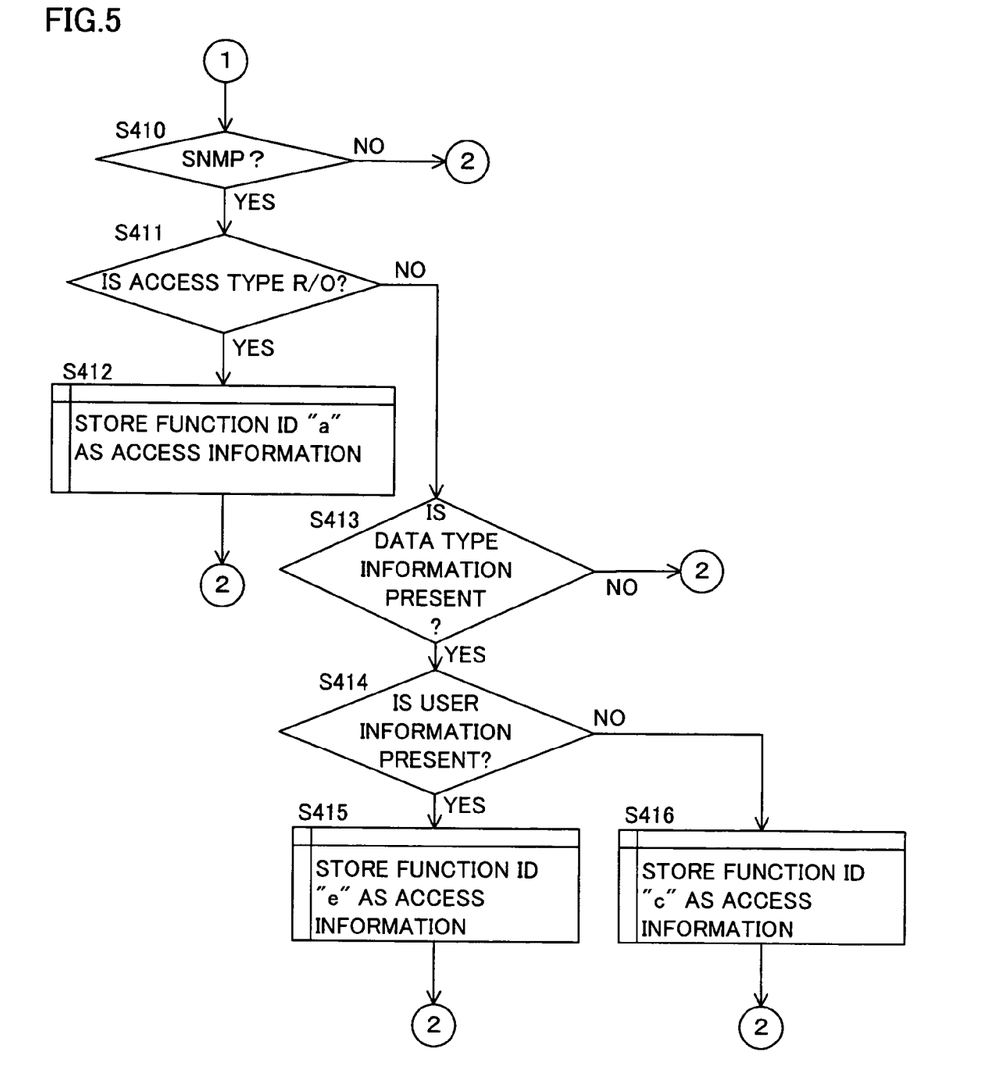

In step S4, CPU 201 specifies a function in the application used for the access based on information transmitted from the information terminal during the access. Referring to FIGS. 4 and 5, a content of the process in step S4 will be described in detail. FIGS. 4 and 5 are flow charts of subroutines of the process in step S4, respectively.

In the process for specifying the function, in step S401, first, CPU 201 determines whether the application has been specified in step S3. If CPU 201 determines that the application has not been specified yet, e.g., a failure to specify the application or the like occurs, the process returns to step S4. If CPU 201 determines that the application has been specified, the process proceeds to step S402.

In step 402, CPU 201 determines whether the installed function table is stored in storage unit 220. If CPU 201 determines that the installed function table is stored in storage unit 220, the process proceeds to step S403. If CPU 201 determines that the installed function table is not stored in storage unit 220, the process returns to step S4.

In step S403, CPU 201 reads the installed function table.

In step S404, CPU 201 determines whether a function ID transmitted from the information terminal is stored in the installed function table. If the function ID is stored in the installed function table, CPU 201 determines that the function corresponding to the function ID is a function to be utilized based on the function ID. The process then returns to step S4. In this case, it is preferable that CPU 201 writes the function ID to, for example, RAM 203. If the function ID is not stored in the installed function table (or the transmitted data does not include the function ID), the process proceeds to step S405.

In step S405, CPU 201 determines whether or not the information transmitted from the information apparatus includes information for specifying the communication protocol. If the CPU 201 determines that the information transmitted from the information apparatus does not include information for specifying the communication protocol, the process returns to step S4. If the CPU 201 determines that the information transmitted from the information apparatus includes information for specifying the communication protocol, the process proceeds to step S406.

In the processes in steps D401 to S405, the application is specified. In addition, if the function can be specified by the function ID transmitted from the information terminal ("YES" in step S404), the function to be utilized is specified by the transmitted function ID.

After step S406, a process for specifying the function to be utilized based on the communication protocol is executed as a process executed if the information transmitted from the communication terminal does not include the function ID.

That is, if the communication protocol is SMTP ("YES" in step S406), then "d" is stored as the function ID in RAM 205 in step S407, and the process returns to step S4. If the communication protocol is FTP ("YES" in step S408), then "b" is stored as the function ID in RAM 205 in step S409, and the process returns to step S4.

If the communication protocol is SNMP ("YES" in step S410) and the type of the access is read-only (R/O) ("YES" in step S411), "a" is stored as the function ID in RAM 205 in step S412. If data type information is present ("YES" in step S413), and the data type information is user information ("YES" in step S414), "e" is stored as the function ID in RAM 205 in step S415. If data type information is present ("YES" in step S413) but the data type information is not user information ("NO" in step S414), "c" is stored as the function ID in RAM 205 in step S416. After steps S412, 415, or 416, the process returns to step S4. Otherwise, the process returns to step S4 without determining the function ID.

Referring again to FIG. 3, after the process in step S4, CPU 201 updates the access information stored in data storage unit 222 in step S5, and the process proceeds to step S6. In this embodiment, results of processes in steps S3 and S4 are added to the access information. Specifically, the information for specifying a user or the information terminal, an access time and the type of the application to be used and the type of the function to be used, which are specified in steps S3 and S4, respectively, are added to the access information.

In step S6, CPU 201 determines whether remote control system server 100 transmits a communication request to information apparatus A. If CPU 201 determines that remote control system server 100 transmits the communication request thereto, the process proceeds to step S7. If CPU 201 determines that remote control system server 100 does not transmit the communication request, the process returns to step S1.

In step S7, CPU 201 included in information apparatus A reads the access information from storage unit 220 (data storage unit 222). In step S8, CPU 201 transmits the read access information to remote control system server 100. If it is confirmed that the read access information has been transmitted in step S9, CPU 201 deletes the information transmitted to remote control system server 100 from the access information stored in data storage unit 222 in step S10. CPU 201 then turns into a standby state.

A program for the processes described above with reference to FIGS. 3 to 5 is stored in, for example, storage unit 220. CPU 201 can execute not only the program stored in storage unit 220 but also a program read by media drive 213 and recorded in a recording medium attachable/detachable to and from information apparatus 200.

In the embodiment described above, the information apparatus can specify the application used for the access and the function of the application based on the protocol or the like used for the access, and can store the history as the access information. In addition, the access information is transmitted to remote control system server 100 if remote control system server 100 transmits the communication request to information apparatus A. In this embodiment, the function to be utilized is specified by the function ID included in the access request transmitted from each of information terminals 300 to 303 to information apparatus 200. Alternatively, in this embodiment, the application ID may be included in the access request so as to specify the application based on an access ID.

Alternatively, CPU 201 may specify the application or the type of the application based on not the information included in the access information or the protocol but on the type of the information which has been actually accessed by CPU 201 or which is to be accessed by CPU 201 (i.e., the type of the access (read/write (R/W)) or the type of the data ("data type" shown in Table 2)), so as to record the specification information in the access information.

The information apparatus may be configured to spontaneously transmit the access information at one time to remote control system server 100 within a predetermined period.

Remote control system server 100 or remote control client terminal 401 or 402 can transmit an advertisement according to an access pattern to the user based on the access information on the information apparatus by mail or the like. For instance, if an upgrade edition of the application used by the user is put on market, the user may be notified of the advertisement of the upgrade edition.

Furthermore, remote control system server 100 or remote control client terminal 401 or 402 can present a proposal about effective use of the application to the user based on the access information on the information apparatus. Specifically, examples of such a proposal include a proposal of using an application that collectively includes functions instead of using a plurality of applications if the application that collectively includes the functions that are individually included in a plurality of applications, respectively is installed in information apparatus 200.

It is assumed specifically that an application C that includes six function IDs "a" to "f", an application D that includes two function IDs "a" and "c", and an application E that includes two function IDs "e" and "f", as shown in Table 3, are installed into information apparatus 200. Namely, the applications D and E as well as the application C that includes all the functions included in the respective applications are installed into information apparatus 200.

TABLE 3

| Application | Function type | Function ID | Communication protocol | Access type | Data type | Utilized function |
|---|---|---|---|---|---|---|
| . | . | . | . | . | . | . |
| . | . | . | . | . | . | . |
| Application C | A | a | SNMP | R/O | Status | Status management |
|  | B | b | FTP | R/W | Counter | Counter management |
|  | C | c | SNMP | R/W | Address information | Address information management |
|  | D | d | SMTP | R/O | Management information | Mail contact |
|  | E | e | SNMP | R/W | User information | User registration |
|  | F | f | HTTP | R/W | Address information | Address information management |
| Application D | A | a | SNMP | R/O | Status | Status management |
|  | C | c | SNMP | R/W | Address information | Address information management |
| Application E | E | e | SNMP | R/W | User information | User registration |
|  | F | f | HTTP | R/W | Address information | Address information management |
| . | . | . | . | . | . | . |
| . | . | . | . | . | . | . |

If the access information on such an information apparatus includes information that a certain user uses the applications D and E, then remote control system server 100 or remote control client terminal 401 or 402 can transmit information on the proposal of using not a plurality of applications, i.e., the applications D and E but the single application, i.e., the application C to the user by mail or the like.

Furthermore, remote control system server 100 or remote control client terminal 401 or 402 may be configured to select a user (or terminal) that uses a mail contact function frequently (with a frequency equal to or higher than a predetermined frequency), and to transmit an advertisement of a product related to mail sending and reception only to the selected user (or terminal).

Moreover, the information apparatus may be configured to determine the communication protocol according to this embodiment using a protocol parser.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information apparatus connected to an information terminal having application software installed in the information terminal, the information apparatus comprising:

an information storage unit to store information therein, said information terminal being configured to use said application software installed in said information terminal to access the information stored in said information storage unit of said information apparatus, a reception unit to receive an access request from said information terminal by means of the application software installed in said information terminal;

a type storage unit to store a plurality of different types of communication protocols to be used by the application software installed in said information terminal to transmit the access request to said reception unit of said information terminal, each of the plurality of communication protocols stored in said type storage unit being respectively associated with at least one of (i) a type of the application software installed in said information terminal to access the information stored in said information storage unit, and (ii) a function of the type of the application software used by said information terminal to access the information stored in said information storage unit;

an access unit to access the information stored in said storage unit based on the access request received by said reception unit;

a determination unit to determine, from among the plurality of communication protocols stored in said type storage unit, a communication protocol utilized by the application software used by said information terminal to transmit the access request received by said reception unit to access the information stored in said storage unit;

a specification unit to specify at least one of the application software and the function of the application software used by said information terminal to access the information stored in said storage unit, by specifying at least one of the application software and the function of the application software used by said information terminal based on (i) the communication protocol determined by said determination unit to be established between said information apparatus and said information terminal when said reception unit receives the access request, and (ii) the at least one of the application software and the function of the application software associated with, in said type storage unit, the communication protocol determined by said determination unit to be established between the information apparatus and said information terminal; and a history storage unit to store the at least one of the application software and the function of the application software specified by said specification unit as a history in said information apparatus.

2. The information apparatus according to claim 1, wherein said specification unit specifies the at least one of the application software and the function of the application software based on an access type and a type of data to be accessed included in the access request received by said reception unit.

3. The information apparatus according to claim 2, wherein said type storage unit is configured to store said access type, said data type, and the at least one of the application software and the function of the application software while associating said access type, said data type, and the at least one of the application software and the function of the application software with one another, and wherein said specification unit specifies the at least one of the application software and the function of the application software based on the access type and the type of data to be accessed included in the access request received by said reception unit while referring to said type storage unit.

4. The information apparatus according to claim 1, wherein said history storage unit stores the at least one of the application software used by said information terminal and the function of the application software used by said information terminal as specified by said specification unit, and information for specifying a user of said information terminal or said information terminal while associating the at least one of the application software and the function of the application software and the information for specifying the user or the information terminal with one another.

5. The information apparatus according to claim 1, further comprising:

a transmission unit to transmit the history stored in said history storage unit to a predetermined apparatus.

6. A method for controlling an information apparatus connected to an information terminal having application software installed in the information terminal, the method comprising the steps of:

storing information in an information storage unit of said information apparatus, said application software being used by said information terminal for accessing the information stored in said information storage unit of said information apparatus;

receiving an access request from said information terminal by means of the application software installed in said information terminal;

storing, in a type storage unit of said information apparatus, a plurality of different types of communication protocols to be used by the application software installed in said information terminal to transmit the received access request, each of the plurality of communication protocols stored in said type storage unit being respectively associated with at least one of (i) a type of the application software installed in said information terminal to access the information stored in said information storage unit, and (ii) a function of the type of the application software used by said information terminal to access the information stored in said information storage unit;

accessing the information stored in said storage unit of said information apparatus based on said received access request;

determining, from among the plurality of communication protocols stored in said type storage unit, a communication protocol utilized by the application software used by said information terminal to transmit the received access request to access the information stored in said storage unit of said information apparatus;

specifying the determined at least one of the application software and the function of the application software used by said information terminal to access said information stored in said storage unit of said information apparatus, by specifying at least one of the application software and the function of the application software used by said information terminal based on (i) the communication protocol determined to be established between said information apparatus and said information terminal when the access request is received in said receiving step, and (ii) the at least one of the application software and the function of the application software associated with, in said type storage unit, the communication protocol determined to be established between said information apparatus and said information terminal; and storing the at least one of the application software and the function of the application software specified in said specifying step as a history in said information apparatus.

7. The method for controlling the information apparatus according to claim 6, wherein said step of specifying specifies the at least one of the application software and the function of the application software based on an access type and a type of data to be accessed included in the access request received by said reception unit.

8. The method for controlling the information apparatus according to claim 7, further comprising the step of:

storing said access type, said data type, and the at least one of the application software and the function of the application software while associating said access type, said data type, and the at least one of the application software and the function of the application software with one another, wherein said step of specifying specifies the at least one of the application software and the function of the application software based on the access type and the type of data to be accessed included in the access request received in said receiving step while referring to said stored access type, said data type, and the at least one of the application software and the function of the application software.

9. The method for controlling the information apparatus according to claim 6, wherein:

said step of storing the at least one of the application software and the function of the application software stores the at least one of the application software used by said information terminal and the function of the application software used by said information terminal as specified in said specifying step, and information for specifying a user of said information terminal or said information terminal while associating the at least one of the application software and the function of the application software and the information for specifying the user or the information terminal with one another.

10. The method for controlling the information apparatus according to claim 6, further comprising the step of:
transmitting the history stored in said history storage unit to a predetermined apparatus.

11. A computer-readable recording medium having a computer program recorded thereon for controlling an information apparatus connected to an information terminal having application software installed in the information terminal, the program causing said information apparatus to execute the steps of:
storing information in an information storage unit of said information apparatus, said application software being used by said information terminal for accessing the information stored in said information storage unit of said information apparatus;
receiving an access request from said information terminal by means of the application software installed in said information terminal;
storing, in a type storage unit of said information apparatus, a plurality of different types of communication protocols to be used by the application software installed in said information terminal to transmit the received access request, each of the plurality of communication protocols stored in said type storage unit being respectively associated with at least one of (i) a type of the application software installed in said information terminal to access the information stored in said information storage unit, and (ii) a function of the type of the application software used by said information terminal to access the information stored in said information storage unit;
accessing information stored in said storage unit of said information apparatus based on said received access request;
determining, from among the plurality of communication protocols stored in said type storage unit, a communication protocol utilized by the application software used by said information terminal to transmit the received access request to access the information stored in said storage unit of said information apparatus;
specifying the determined at least one of the application software and the function of the application software used by said information terminal to access said information stored in said storage unit of said information apparatus, by specifying at least one of the application software and the function of the application software used by said information terminal based on (i) the communication protocol determined to be established between said information apparatus and said information terminal when the access request is received in said receiving step, and (ii) and the at least one of the application software and the function of the application software associated with, in said type storage unit, the communication protocol determined by said determination unit to be established between the information apparatus and said information terminal; and
storing the at least one of the application software and the function of the application software specified in said specifying step as a history in said information apparatus.

12. An information apparatus connected to an information terminal, said information terminal having an application installed therein for accessing information held in said information apparatus, said information apparatus comprising:
a storage unit to store at least one of the application and a function of the application such that the at least one of the application and the function of the application is stored in association with at least one of (a) a type of the information, (b) a communication protocol used by the application when accessing the information, and (c) whether a type of access by the application to the information is read or write;
a specification unit to specify at least one of the application and the function of the application used by said information terminal to access the information, based on what is stored by said information apparatus, from at least one of
the type of the information accessed by said information terminal,
the communication protocol established between said information apparatus and said information terminal from among a plurality of different types of communication protocols, and
whether the type of access to said information is read or write; and
a history storage unit to store, as a history, at least one of the specified application and the function of the application specified by said specification unit,
wherein each one of the plurality of different types of communications protocols is respectively associated with at least one of (i) the application installed in said information terminal to access the information held in said information apparatus, and (ii) a function of the application installed in said information terminal to access the information held in said information apparatus.

13. A method of controlling an information apparatus connected to an information terminal, said information terminal having an application installed therein for accessing information held in said information apparatus, and said information apparatus storing at least one of the application and a function of the application such that the at least one of the application and the function of the application is stored in association with at least one of (a) a type of the information, (b) a communication protocol used by the application when accessing the information, and (c) whether a type of access by the application to the information is read or write, said method comprising the steps of:
specifying at least one of the application and the function of the application used by said information terminal to access the information, based on what is stored by said information apparatus, from at least one of
the type of the information accessed by said information terminal from among a plurality of different types of information,
the communication protocol established between said information apparatus and said information terminal from among a plurality of different types of communication protocols, and
whether the type of access to said information is read or write; and
storing, as a history, at least one of the specified application and the function of the specified application,
wherein each one of the plurality of different types of communications protocols is respectively associated with at least one of (i) the application installed in said information terminal to access the information held in said information apparatus, and (ii) a function of the application installed in said information terminal to access the information held in said information apparatus.

14. A non-transitory computer-readable recording medium having a computer program recorded thereon to control an information apparatus connected to an information terminal, said information terminal having an application installed therein for accessing information held in said information apparatus, and said information apparatus storing at least one of the application and a function of the application such that the at least one of the application and the function of the application is stored in association with at least one of (a) a type of the information, (b) a communication protocol used by the application when accessing the information, and (c) whether a type of access by the application to the information is read or write, said program causing said information apparatus to execute the steps of:

specifying at least one of the application and the function of the application used by said information terminal to access the information, based on what is stored by said information apparatus, from at least one of         the type of the information accessed by said information terminal from among a plurality of different types of information,         the communication protocol established between said information apparatus and said information terminal from among a plurality of different types of communication protocols, and         whether the type of access to said information is read or write; and     storing, as a history, at least one of the specified application and the function of the specified application,     wherein each one of the plurality of different types of communications protocols is respectively associated with at least one of (i) the application installed in said information terminal to access the information held in said information apparatus, and (ii) a function of the application installed in said information terminal to access the information held in said information apparatus.

* * * * *